United States Patent [19]

Juba

[11] 3,749,838

[45] July 31, 1973

[54] SOUND GENERATING DEVICE FOR SIGNALING AND RESPONDING TO NUISANCE TELEPHONE CALLS

[76] Inventor: John T. Juba, 65 River Edge Farms Rd., Madison, Conn. 06443

[22] Filed: Nov. 30, 1970

[21] Appl. No.: 93,720

[52] U.S. Cl. .................................................. 179/2 C
[51] Int. Cl. .......................................... H04m 11/02
[58] Field of Search .................. 179/1 C, 2 C, 84 T, 179/84 UF, 18 FH, 100 C, 100 R; 340/384 E

[56] References Cited

UNITED STATES PATENTS

| | | | |
|---|---|---|---|
| 3,515,806 | 6/1970 | Spraker | 179/1 C |
| D202,191 | 9/1965 | Divietro | 179/1 C |
| 3,592,966 | 7/1971 | Hansen | 179/1 C |
| 2,165,546 | 7/1939 | Heller | 179/1 C |
| 3,546,397 | 12/1970 | Laing | 179/100 R |
| 3,130,270 | 4/1964 | Sanders | 179/1 C |
| 3,156,771 | 11/1964 | Vaughn | 179/1 C |
| 3,136,852 | 6/1964 | Kay | 179/1 C |
| 3,603,985 | 9/1971 | Goralnick | 340/384 E |

*Primary Examiner*—Kathleen H. Claffy
*Assistant Examiner*—David L. Stewart
*Attorney*—Roy L. Parsell

[57] ABSTRACT

A device which can be placed near a telephone set on a table or hung on the wall on which the telephone set may be placed to respond to an undesired call such as a nuisance or obscene call.

The device comprises a housing containing a battery power speaker which emits a high frequency tone or howl which can be picked up by the transmitter of the telephone set placed in an opening in the housing provided for this purpose. Placing the transmitter in the housing automatically turns on the speaker. In another embodiment the speaker is omitted and the sound connection made directly to the telephone line.

2 Claims, 9 Drawing Figures

INVENTOR.
John T. Juba
BY
Roy L. Parsell
ATTORNEY

INVENTOR.
John T Juba

BY Roy L Parsell

ATTORNEY.

INVENTOR.
John T. Juba
BY Roy L. Parsell
ATTORNEY.

SOUND GENERATING DEVICE FOR SIGNALING AND RESPONDING TO NUISANCE TELEPHONE CALLS

BACKGROUND OF THE INVENTION

1. Field of the Invention

A device to be used with the telephone set to emit a high frequency sound into the telephone transmitter upon placing the telephone set on the device after the called party determines that the call is a nuisance and wishes to discourage the party making the call.

2. Description of the Prior Art

The development of the direct dialing of telephone calls and the placing of pay stations in public and semi-public places has enabled persons to dial numbers at random to engage the answering person in conversation, whether for purposes of amusement or curiosity. A practice of nuisance and obscene calls has also resulted. While the police and telephone companies are endeavoring to trace down the calls and punish the offenders, their efforts are limited for technical and legal reasons. No simple means is available to the subscriber to combat this nuisance other than the herein described device.

The present invention makes use of transistor powered circuits and a loudspeaker which emits a howling sound in answer to the caller. The subscriber does not speak but merely responds by depositing the telephone hand set onto the the device so that the desired tone or howling sound is picked up by the transmitter of the hand set.

SUMMARY

A housing which may be placed on a desk or table or hung on a wall adjacent a telephone set. The housing is provided with a shallow opening to receive the telephone transmitter when placed in the opening by the recipient of the call if the latter determines that the call is a nuisance and does not wish to speak.

Within the housing adjacent the opening is a loudspeaker which emits an unpleasant high frequency tone generated by an electronic means, preferably an oscillator circuit which may be powered by a battery.

Placing the telephone set in the opening engages a movable member for actuating a micro switch means to close the circuit. Removing the telephone set opens the circuit.

One object of the invention is to discourage nuisance telephone calls by returning an unpleasant sound.

Another object is to answer the call without the necessity of disclosing one's voice.

Still another object is to provide an inexpensive device which can be installed by the telephone subscriber without interfering with the telephone wires.

DESCRIPTION OF THE PREFERRED EMBODIMENTS

Figures 1, 2:
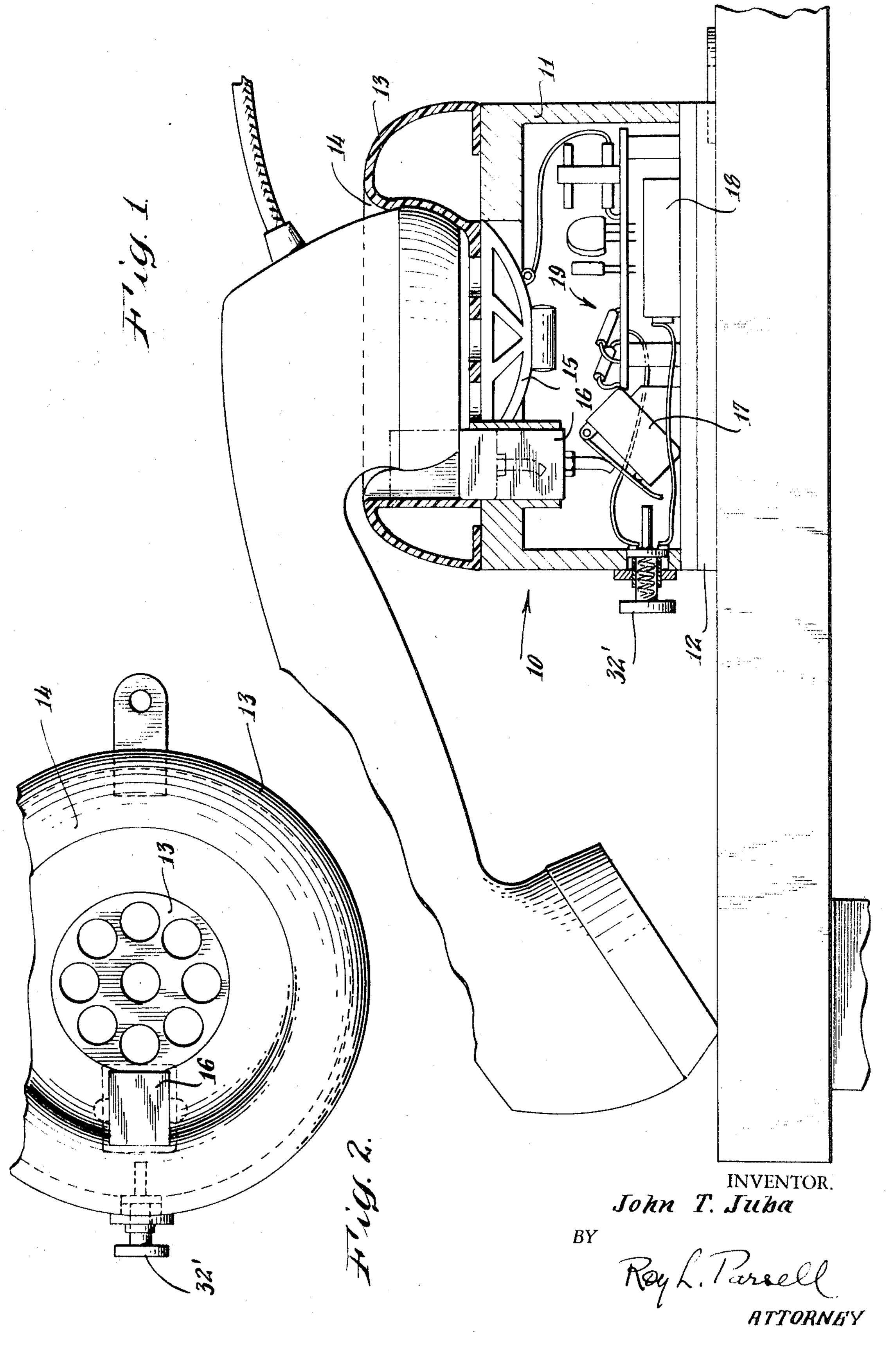
FIG. 1 is a sectional elevation of the device showing a telephone hand set in operating position on the device.
FIG. 2 is a plan view of the housing portion of the device shown in FIG. 1.

Referring now to FIGS. 1 and 2 of the drawings, numeral 10 denotes a preferred embodiment of the device having a housing 11 mounted on a base 12. The housing 11 is provided with an opening 14 in the top side to receive the transmitter end portion of a telephone set. A resilient ring 13, mounted in the opening 14, engages this end portion of the telephone set and serves to hold it in place.

A speaker 15 (FIG. 1) is mounted in the bottom of the opening 14 in the housing 11 and directed toward the transmitter of the telephone set as it reposes in the opening 14.

A switch engaging plunger 16 is reciprocatingly disposed at the periphery of the opening 14 to activate a micro switch 17 by the weight of the telephone set when the telephone set is received in the opening 14.

Figure 7:
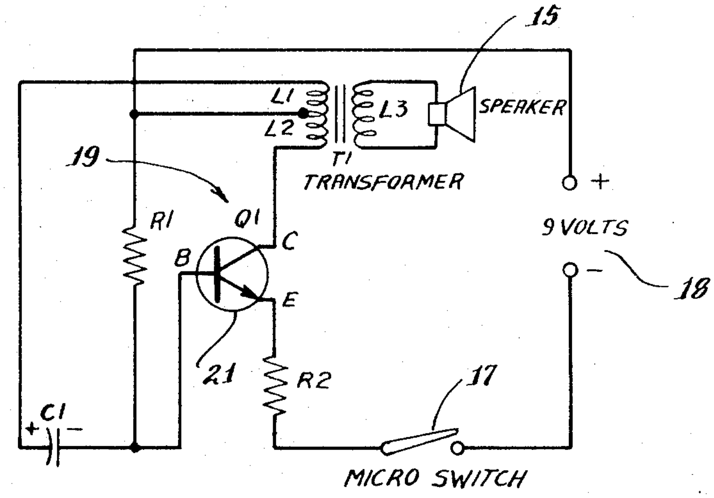
FIG. 7 shows the circuit for the preferred embodiment.

The switch 17 closes a circuit comprising a battery 18, an oscillator circuit 19, and a speaker 15 (see also FIG. 7). Instead of a speaker I may use a buzzer (not shown) having a loud tone and omit the oscillator circuit 19.

Spring means (not shown) maintains the switch 17 in open contact state including plunger 16 when the telephone set is not reposing in the opening 14.

The housing 11 and base 12 are preferably formed of a molded plastic. The opening 14 in the top side of the housing is provided with a resilient ring 13 of molded rubber or plastic to retain the telephone set in position as well as to make a seal so that the sound emitted from the speaker 15 will not be lost.

Figures 3, 4, 5, 6:
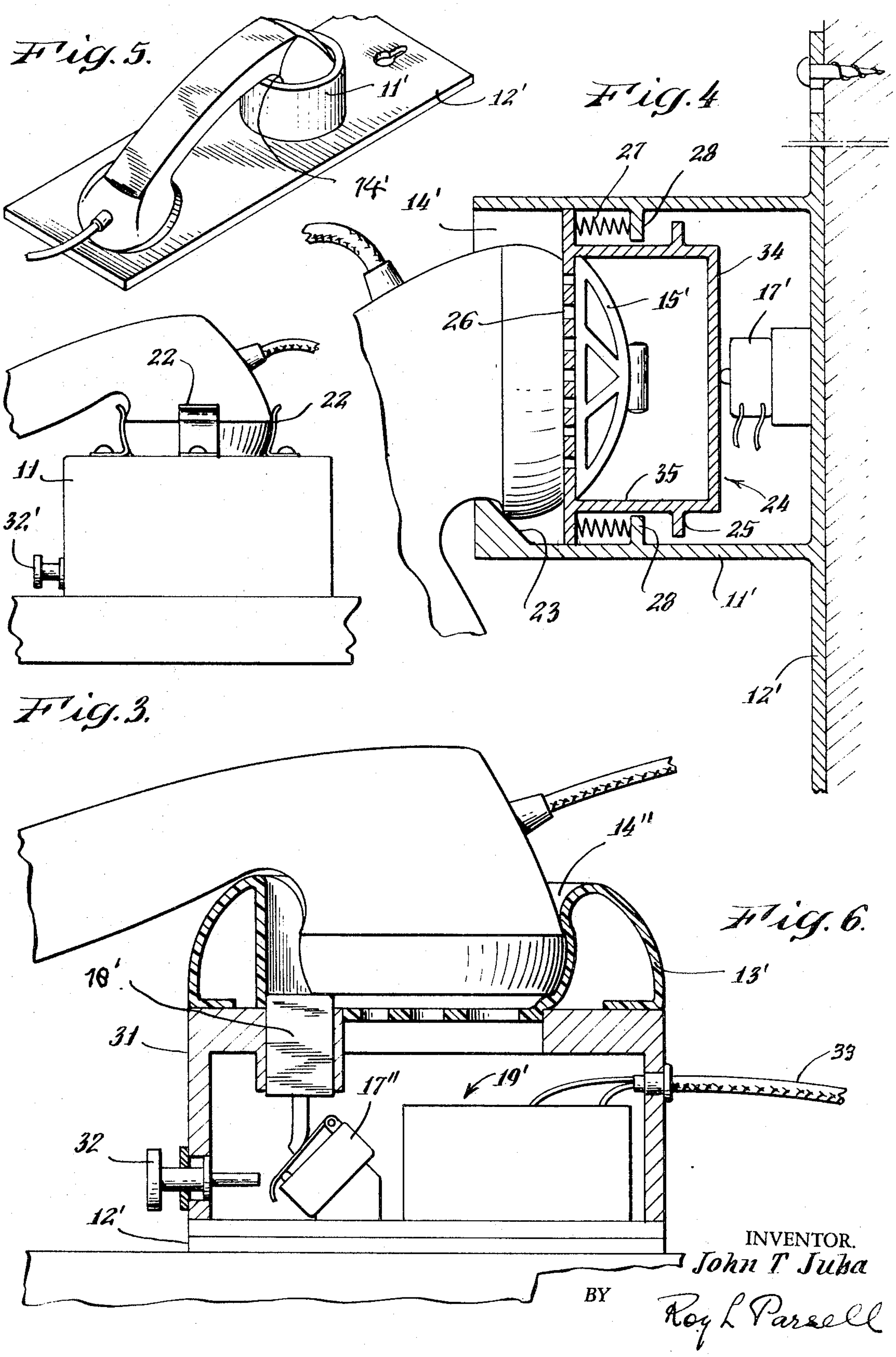
FIG. 3 is an elevation view showing another embodiment for retaining the hand set in place.
FIG. 4 is another embodiment of the housing adapted for mounting on a wall shown partly in sectional elevation.
FIG. 5 is a perspective view showing the same embodiment as that of FIG. 4, reposing on a horizontal surface.
FIG. 6 is an elevation view of still another means for holding the hand set in position to pick up the response tone.

Instead of a resilient ring 13 I may use spring clips 22 as shown in FIG. 3.

In another embodiment (FIG. 4) I use a housing 11' which may hang on the wall or may be turned through 90° and repose on a horizontal surface such as a table or desk (see FIG. 5). The interior 14' of the housing 11' is in the form of a well extending into the face of housing 11' to receive the end of the telephone set and to house the switch engaging member 24.

As shown in FIG. 4 the horizontal component of weight of the telephone set in combination with the abutment-like surface 23 forming a portion of the well opening in the face of the housing 11' is used to actuate the switch 17' by moving the switch engaging unit 24 to the right as viewed in FIG. 4 to activate the switch 17' (through switch engaging unit 24 to be subsequently described) as the transmitter portion slides down the inclined surface 23.

When the housing 11' is reposing on a horizontal surface instead of the wall, i.e., with opening 14' at the top (see FIG. 5), then the weight of the transmitter portion of the telephone set viz. the vertical weight component will actuate the switch 17' through the reciprocating switch engaging unit 24 presently to be described without the necessity of the inclined bevel abutment surface 23.

Speaker 15' is mounted adjacent opening 14' (FIG. 4) by any suitable means (not shown) with its horizontal axis approximately aligned with the horizontal axis of the opening 14'. The switch engaging unit 24 comprises essentially a hollow or cup-shaped frame unit having a foraminous plate 26 forming one side of the unit 24 for engagement with the telephone set.

Forming the opposite side or base of the switch engaging unit 24 is another plate like member 34 for engaging the micro switch 17.

The foraminous plate 26 and the base plate 24 are connected together by parallel side frame members 35 so disposed as to clear the supporting members (not shown) which hold the speaker 15' in position.

Guide lugs 28 (FIG. 4) mounted on opposite interior walls of the housing 11' in combination with the perimeter of the foraminous plate 26 maintain the switch engaging unit aligned with the axis of the opening 14' to reciprocate between "off" and "on" positions of micro switch 17'.

Stop lugs 25 mounted on side frame members 35 of the switch engaging unit 24 arrest the reciprocation of unit 24 toward the opening 14' when the telephone set is not in the opening 14' and while under the bias of springs 27.

The overall circuit shown in FIG. 7 is now described in detail. Battery 18 may be a standard transistor type generally known as a 9VDC. Switch 17 is normally open but is closed by means of plunger 16 when the telephone set is placed in the opening 14 upon answering of the telephone call.

The oscillator circuit 19 (FIG. 7) is a standard circuit and not claimed per se as part of my invention.

The RF output of the oscillator 19 is used to drive speaker 15. The feedback energy is derived from inductor $L_2$ connected to the collecting terminal of transistor 21.

Figure 8:
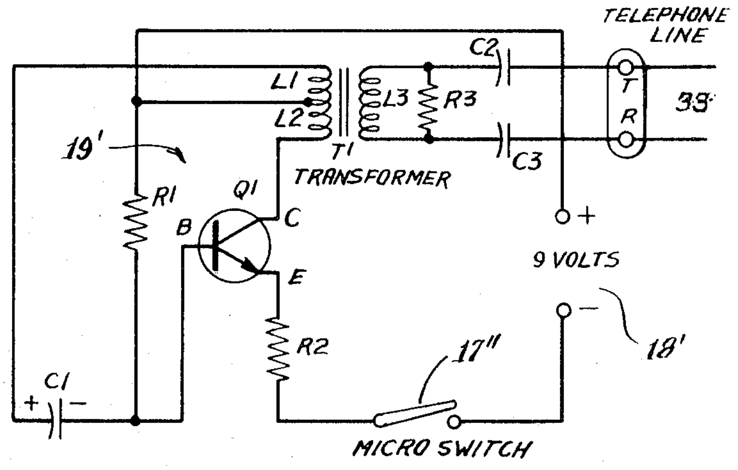
FIG. 8 shows the circuit of another embodiment.
Figure 9:
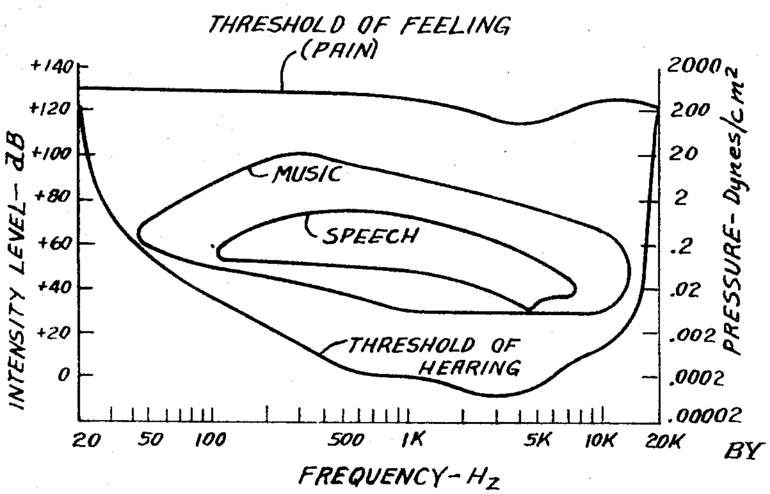
FIG. 9 is a chart of coordinates showing the sound intensity in decibels plotted against frequency in $H_z$ wave energy.

In another embodiment in circuitry as shown in FIG. 8 I disconnect the speaker and connect the output of oscillator 19 directly to the telephone line 33 by means of condensers C2 and C3 and resistor R3.

In still another embodiment as shown in FIG. 6 I provide a housing 31 which is provided with an opening 14'' for receiving the telephone set but has no speaker. Instead of a speaker I use the circuit shown in FIG. 8. Placing the telephone set in the opening activates the micro switch 17'' through plunger 16' and the oscillator 19 feeds directly into the telephone line as previously described.

I also provide a manual button 32 which also operates the micro switch 17'' instead of the plunger 16' so that it is not necessary to place the telephone set into the opening 14'' but is of course desirable to hold the telephone set away from the ear.

In yet another embodiment (not shown), I provide a sort of miniature device in which the housing might be likened in size to a pack of playing cards. The speaker is mounted in or on the housing wall with its face parallel to one of the flat sides. The side may be perforated if desired. The same type of oscillator circuit means drives the speaker as previously described including circuit closing switch means and a battery. A button means or plunger is mounted on the narrow side of the housing for actuating the switch. This button means is so placed that as the housing is held in the palm of the hand the thumb can easily contact the button means. In use, the person answering the telephone call would hold the telephone set in one hand and with the other hold the miniature device with speaker side against the telephone transmitter and at the same time press the button.

Such a miniature embodiment may have other uses such as a calling or signaling means to be used in a hospital or sick room by the patient to call for aid.

The miniature device might be adapted for calling a dog where the oscillator circuit could be tuned for the emitting of a sound heard by the dog yet not by the human being.

While I have specifically referred to a battery as a source of power where practical, I may use a transformer to avail myself of the standard house current.

Furthermore, the drawings show the most common type of telephone set but my invention is not limited to that particular style since suitable adaptations may be made in my device to accommodate such other styles without departing from the spirit of the invention.

I claim:

1. A device for responding to an undesired telephone call by generating a sound of relatively high intensity level which is directed into the transmitter of the telephone set of the recipient of the undesired call comprising a. a housing having a well extending inwardly from an opening in the wall of the housing for receiving only the transmitter end of a telephone set and including an abutment sloping inwarding disposed at the mouth of the well;

b. a hollow frame member movable along the axis of the well including

1. a first side portion of the frame member engageable with the transmitter face of a telephone set for sound coupling therewith,

2. a second side portion of the frame member engageable with a switch means, and

3. a stop lug mounted on a third side of the frame member.

c. a loud speaker disposed within said frame member for directing said sound of relatively high intensity level into the transmitter portion of a telephone set and driven by circuit means for generating said sound of relatively high intensity level, said circuit means being activated by switch means positioned behind said second side portion;

d. resilient means biasing the frame member toward the well opening in the wall of the housing;

e. a guide lug mounted on the wall of the well engageable with said stop lug to limit the movement of the frame toward the well opening; whereby when the frame member is displaced by placing the transmitter end of the telephone set between the abutment and the movable frame member, the movable frame member is forced against the biasing of the resilient means to engage the switch means to thereby activate the circuit means.

2. A device for responding to an undesired telephone call by generating a sound of relatively high intensity level which is directed into the transmitter of the telephone set of the recipient of the undesired call comprising a. a housing having a well extending inwarding from an opening in the wall of the housing for receiving only the transmitter end of a telephone set and including an abutment sloping inwardly disposed at the mouth of the well;

b. a hollow frame member movable along the axis of the well including 1. a first side portion of the frame member engageable with the transmitter face of a telephone set for sound coupling therewith,
2. a second side portion of the frame member engageable with a switch means, and
3. a stop lug mounted on a third side of the frame member.

c. a sound generating magnetic vibrating member disposed within the frame member and driven by circuit means for generating said sound of relatively high intensity level, said circuit means being activated by switch means positioned behind said second side portion;

d. resilient means biasing the frame member toward the well opening in the wall of the housing;

e. a guide lug mounted on the wall of the well engageable with said stop lug to limit the movement of the frame toward the well opening; whereby when the frame member is displaced by placing the transmitter end of the telephone set between the abutment and the movable frame member, the movable frame member is forced against the biasing of the resilient means to engage the switch means to thereby activate the circuit means.

* * * * *